(12) United States Patent
Umemoto

(10) Patent No.: US 7,012,660 B1
(45) Date of Patent: Mar. 14, 2006

(54) LIQUID-CRYSTAL DISPLAY DEVICE AND LIGHT PIPE

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/552,715

(22) Filed: Apr. 19, 2000

(30) Foreign Application Priority Data

Apr. 20, 1999 (JP) ............................... P 11-111756

(51) Int. Cl.
*G02F 1/1335* (2006.01)

(52) U.S. Cl. ........................... 349/65; 362/31; 385/901; 385/129

(58) Field of Classification Search .................. 349/65; 362/31, 26; 385/901, 129
See application file for complete search history.

(56) References Cited

U.S. PATENT DOCUMENTS

| | | | | |
|---|---|---|---|---|
| 5,420,761 A | * | 5/1995 | DuNah et al. | ................. 362/31 |
| 5,485,291 A | | 1/1996 | Qiao et al. | |
| 5,532,852 A | * | 7/1996 | Kalmanash | .................. 349/96 |
| 5,659,410 A | * | 8/1997 | Koike et al. | .................... 349/62 |
| 5,664,862 A | * | 9/1997 | Redmond et al. | ............. 362/31 |
| 5,710,856 A | * | 1/1998 | Ishii et al. | .................... 385/146 |
| 5,838,403 A | * | 11/1998 | Jannson et al. | ................ 349/65 |
| 5,999,685 A | * | 12/1999 | Goto et al. | .................. 385/146 |
| 6,049,649 A | * | 4/2000 | Arai | ........................... 385/133 |
| 6,151,089 A | * | 11/2000 | Yang et al. | .................. 349/113 |
| 6,199,995 B1 | * | 3/2001 | Umemoto et al. | ............. 362/31 |
| 6,224,223 B1 | * | 5/2001 | Higuchi et al. | ............... 362/31 |
| 6,507,378 B1 | * | 1/2003 | Yano et al. | .................... 349/63 |
| 6,507,379 B1 | * | 1/2003 | Yokoyama et al. | ........... 349/69 |
| 2001/0019479 A1 | * | 9/2001 | Nakabayashi et al. | ........ 362/31 |

FOREIGN PATENT DOCUMENTS

| | | |
|---|---|---|
| EP | 0 950 851 A1 | 10/1999 |
| JP | 7-5462 | 1/1995 |
| JP | 8-94844 | 4/1996 |
| JP | 11-52370 | 2/1999 |
| KR | 1998-029982 | 7/1998 |
| KR | 1999-006899 | 1/1999 |

* cited by examiner

*Primary Examiner*—Kenneth Parker
(74) *Attorney, Agent, or Firm*—Sughrue Mion, PLLC

(57) ABSTRACT

A liquid-crystal display device has a light pipe, a light source, a reflection layer, and a liquid-crystal shutter. The light pipe includes light output means formed on an upper surface of the light pipe. The light source is disposed near to an incident side surface of the light pipe so that light incident from the light source is output from a lower surface of the light pipe through the light output means. The reflection layer is disposed on the lower surface of the light pipe so that reflected light of the output light is transmitted through the upper surface of the light pipe. The liquid-crystal shutter is disposed above the upper surface of the light pipe, the liquid-crystal shutter including liquid-crystal cells and at least one polarizing plate.

22 Claims, 3 Drawing Sheets

LIQUID-CRYSTAL DISPLAY DEVICE AND LIGHT PIPE

BACKGROUND OF THE INVENTION

1. Field of the Invention

The present invention relates to a liquid-crystal display device which is excellent in light utilizing efficiency and which provides a brilliant display easy to see, and a light pipe which can be used for forming the liquid-crystal display device.

The present application is based on Japanese Patent Application No. Hei. 11-111756, which is incorporated herein by reference.

2. Description of the Related Art

There is investigation of a liquid-crystal display device which is used both in a reflection and a transmission mode so that the device can be visually recognized in use of the transmission type liquid-crystal display device in a dark place, or the like, by addition of an illuminator while the merit of a reflection type liquid-crystal display device of small power consumption is used widely. For example, there have been proposed a liquid-crystal display device using a semi-transmission type reflection plate, a liquid-crystal display device in which a back light used in a transmission type liquid-crystal display device is provided as a front light on the visual recognition side of liquid-crystal cells, and so on.

The system utilizing such a semi-transmission type reflection plate, however, had a disadvantage that the system in either mode was inferior in brightness to the reflection or transmission type device for exclusive use because light was separated into reflected and transmitted light by a half-mirror effect. There was a proposal to make an improvement by use of a reflection polarizer for reflecting polarized light selectively so that the sum of reflectivity and transmissivity was able to exceed 100%. However, there were problems in that the light utilizing efficiency in a transmission mode was reduced to be not higher than 50% because of absorption by a light absorber disposed for preventing both display inversion between reflection and transmission and emphasis of a black display, and display was hard to see in the evening twilight in either mode. On the other hand, there was a problem in that the front light system was apt to make a display darker in a transmission mode than the general transmission type liquid-crystal display device because light went to light-crystal cells, or the like, and came back. Accordingly, an injury of a light pipe or a contaminant thereon became conspicuous as a bright spot, and display contrast was lowered by leakage of light from an upper surface of the light pipe.

SUMMARY OF THE INVENTION

An object of the present invention is to develop a liquid-crystal display device of good visual recognition which is excellent in brightness both in reflection and transmission modes, and in which both display inversion and lowering of contrast due to leakage of light do not occur.

In order to achieve the above object, according to the present invention, there is provided a liquid-crystal display device comprising: a light pipe including light output means formed on an upper surface of the light pipe; a light source disposed near to an incident side surface of the light pipe so that light incident from the light source is output from a lower surface of the light pipe through the light output means; a reflection layer disposed on the lower surface of the light pipe so that reflected light of the output light is transmitted through the upper surface of the light pipe; and a liquid-crystal shutter disposed above the upper surface of the light pipe, the liquid-crystal shutter including liquid-crystal cells, and at least one polarizing plate.

According to the present invention, brightness approximately equal to that of the background-art reflection type liquid-crystal display device can be achieved in a reflection mode by a structure in which the light pipe is disposed between the liquid-crystal cells and the reflection layer because lowering of light utilizing efficiency caused by absorption loss, reflection loss, etc. due to the light pipe in the reflection mode is slight. Moreover, brilliance equal to that of the background-art transmission type liquid-crystal display device can be achieved in a transmission mode. Moreover, display inversion does not occur between reflection and transmission, so that lowering of contrast is prevented from being caused by leakage light out of the light pipe. Hence, a liquid-crystal display device of good visual recognition can be obtained.

Moreover, a light path in the light pipe in the transmission mode can be elongated by provision of the light output means on the upper surface of the light pipe. Hence, the spread of light is widened, so that the intensity of a bright line can be relaxed. This effectively acts on both prevention of occurrence of moire and enhancement of uniformity of display advantageously, so that the reflection layer can be disposed on the lower surface of the light pipe so as to be brought into contact with and integrated with the light pipe through a tacky layer, or the like, easily. If such light output means is provided on the lower surface of the light pipe, it is necessary to provide an independent reflection plate separately in terms of the maintenance of the function of the light output means. As a result, the structure of the device is complicated because of increase in the number of parts and arrangement and fixation of the reflection plate. As a result, there is a disadvantage that the weight of the device becomes heavy because a thick support is required for preventing disorder of display from being caused by generation of wrinkles.

Further, in the case of a light pipe having light output means constituted by slopes such as prism-like irregularities, the light pipe is excellent in directivity of reflected light through the slopes. Accordingly, light advantageous to visual recognition in a transmission mode can be formed efficiently, so that more brilliant display can be obtained. The light pipe is further excellent both in incident efficiency of external light and in transmission efficiency after reflection thereof. Accordingly, more brilliant display can be obtained also in a reflection mode by light emission excellent both in light utilizing efficiency and in uniformity. Further, generation of moire due to the foregoing directivity can be suppressed by oblique arrangement of the light output means, so that inhibition of visual recognition due to dazzling light can be prevented from being generated.

As described above, in the case of a light pipe provided with scatter type light output means such as dots, embossed irregularities, or the like, output light is emitted at a large angle of about 60 degrees, so that display in a transmission mode is dark and hard to see in a frontal (vertical) direction. If a prism sheet is disposed for the purpose of controlling the light path, light is scattered in a reflection mode, so that a display is made very dark because a large part of light does not contribute to visual recognition. If a diffusion layer of strong diffusing property is disposed in order to prevent dots, or the like, from being visible too clearly, a dark display is obtained in a reflection mode because both incident and reflected light thereof from the reflection layer are also scattered in the reflection mode.

Features and advantages of the invention will be evident from the following detailed description of the preferred embodiments described in conjunction with the attached drawings.

DETAILED DESCRIPTION OF THE PREFERRED EMBODIMENTS

Figure 1:
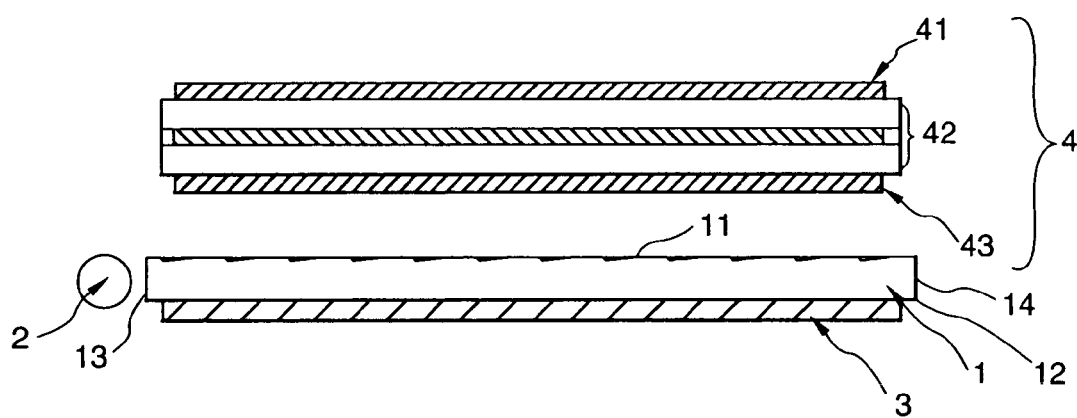
FIG. 1 shows an explanatory sectional view of an embodiment of a liquid-crystal display device.

In the liquid-crystal display device according to the present invention, the device comprises: a light pipe including light output means formed on an upper surface of the light pipe; a light source disposed near to an incident side surface of the light pipe so that light incident from the light source is output from a lower surface of the light pipe through the light output means; a reflection layer disposed on the lower surface of the light pipe so that reflected light of the output light is transmitted through the upper surface of the light pipe; and a liquid-crystal shutter disposed above the upper surface of the light pipe, the liquid-crystal shutter including liquid-crystal cells, and at least one polarizing plate. Thus, the device can be used both in the reflection and transmission modes. FIG. 1 shows an embodiment of the liquid-crystal display device. The reference numeral 1 designates a light pipe; 11, an upper surface forming light output means of the light pipe 1; 2, a light source; 3, a reflection layer; 4, a liquid-crystal shutter; 41 and 43, polarizing plates; and 42, liquid-crystal cells.

As shown in the embodiment of FIG. 1, used as the light pipe is a plate-like material which has an upper surface 11, a lower surface 12 opposite to the upper surface, and an incident side surface 13 constituted by a side surface between the upper and lower surfaces and which is configured so that light incident on the incident side surface is output from the lower surface through the light output means formed on the upper surface 11. The light pipe may be of a uniform thickness type as illustrated in FIG. 1 or may be of a type in which the thickness of an opposite end 14 opposite to an incident side surface 13 is set to be smaller than that of the incident side surface. Reduction of the thickness of the opposite end is advantageous in terms of reduction of weight, improvement of efficiency of light incident on the incident side surface toward the light output means of the upper surface, and so on.

The light output means provided on the upper surface of the light pipe can be constituted by an appropriate member exhibiting the aforementioned output characteristic. From the point of view of obtaining illumination light excellent in frontal directivity through the reflection layer, the preferred is light output means having slopes facing the incident side surface, particularly light output means constituted by prism-like irregularities.

Figure 2:
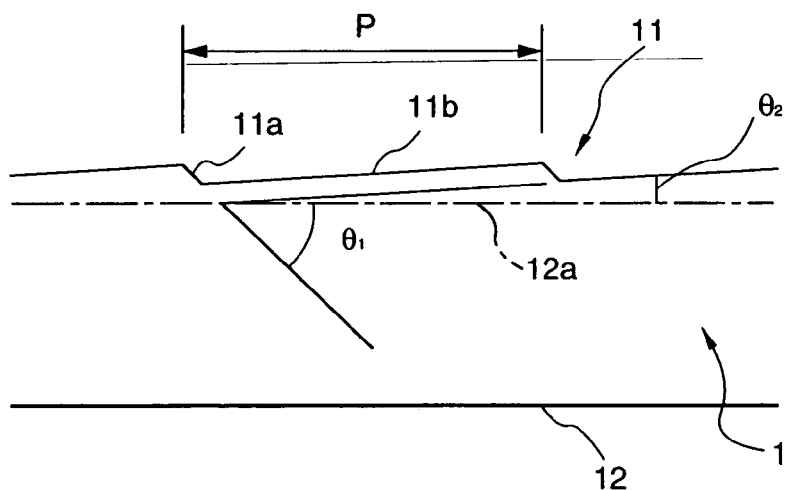
FIG. 2 shows an explanatory side view of light output means in a light pipe.

Although the aforementioned prism-like irregularities may be constituted by projections or recesses having equilateral surfaces, it is preferable from the point of view of light utilizing efficiency, or the like, that the prism-like irregularities are constituted by projections or recesses each having a short side and a long side surface. FIG. 2 shows an example of the prism-like irregularities. The reference numeral 11a designates a short side surface; and 11b, a long side surface.

The light output means preferred from the point of view of achieving the aforementioned characteristic such as frontal directivity, or the like, is constituted by a repetitive structure of irregularities each of which has a slope inclined at an inclination angle of from 35 to 45 degrees with respect to a reference plane of the lower surface, and a flat surface inclined at an angle of not larger than 10 degrees. Especially, as shown in FIG. 2, the light output means is constituted by a repetitive structure of prism-like irregularities each of which has a short side surface 11a ($\theta_1$) inclined downward from the incident side surface 13 toward the opposite end 14 at an inclination angle of from 35 to 45 degrees with respect to the reference plane 12a of the lower surface 12, and a long side surface 11b ($\theta_2$) inclined at an inclination angle of from 0 to 10 degrees, exclusive of 0 degree, with respect to the same reference plane 12a.

In the above description, the short side surface 11a formed as a slope inclined downward from the incident side surface toward the opposite end plays a role of reflecting light incident on the short side surface among incident light given from the incident side surface to thereby supply the reflected light to the lower surface (reflection layer). In this case, setting the inclination angle $\theta_1$ of the short side surface to be in a range of from 35 to 45 degrees permits transmitted light to be reflected well perpendicularly to the lower surface as shown by the polygonal line arrow in FIG. 3. As a result, output light (illumination light) excellent in frontal directivity can be obtained through the reflection layer 3 efficiently.

The preferred inclination angle $\theta_1$ of the short side surface from the point of view of the aforementioned frontal directivity, or the like, is in a range of from 38 to 44 degrees, especially in a range of from 40 to 43 degrees, in consideration of the fact that the condition for total internal reflection of light transmitted in the inside of the light pipe on the basis of Snell laws of refraction is generally ±41.8 degrees.

Figure 3:
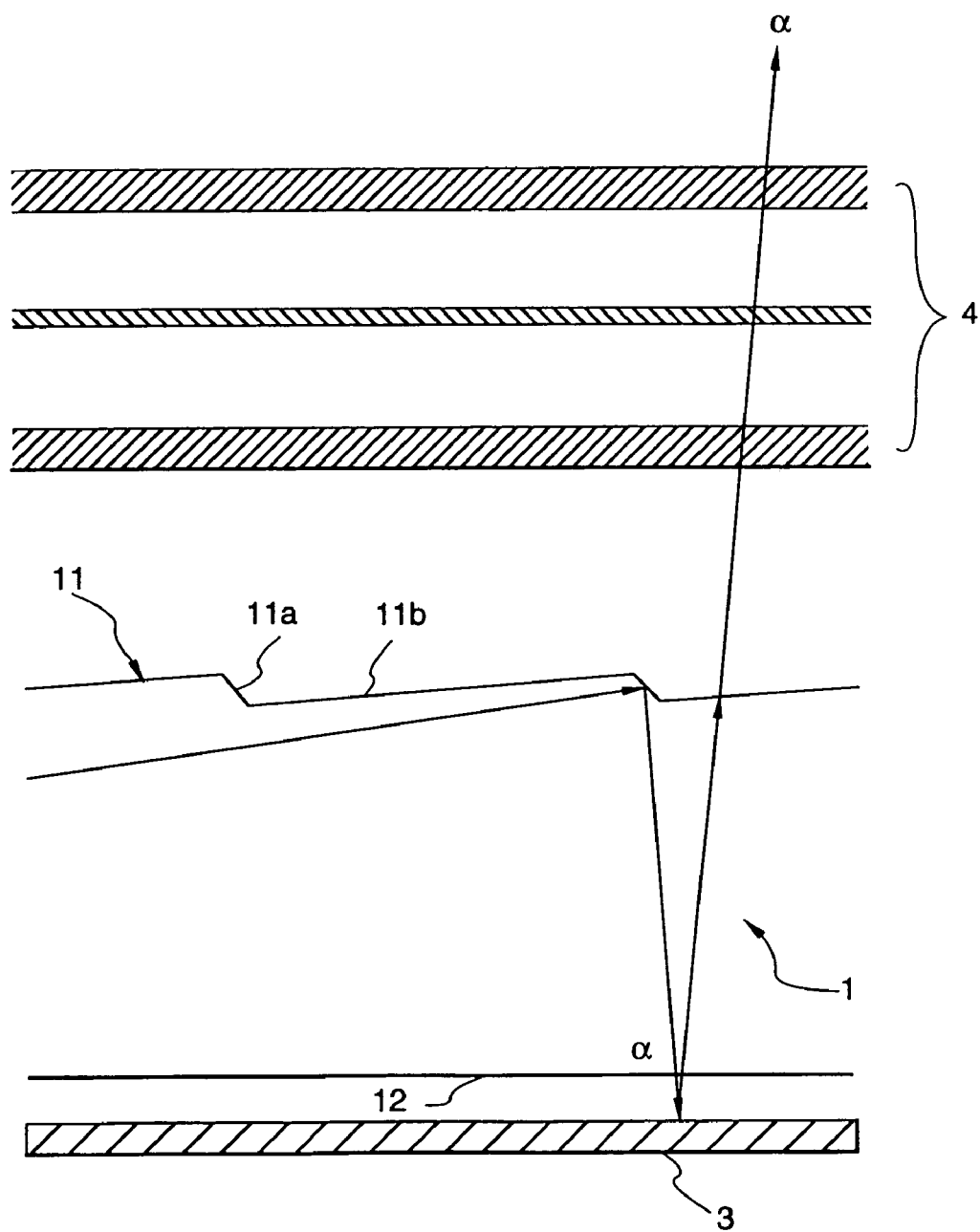
FIG. 3 shows an explanatory view of a visual recognition state in a transmission mode.
Figure 4:
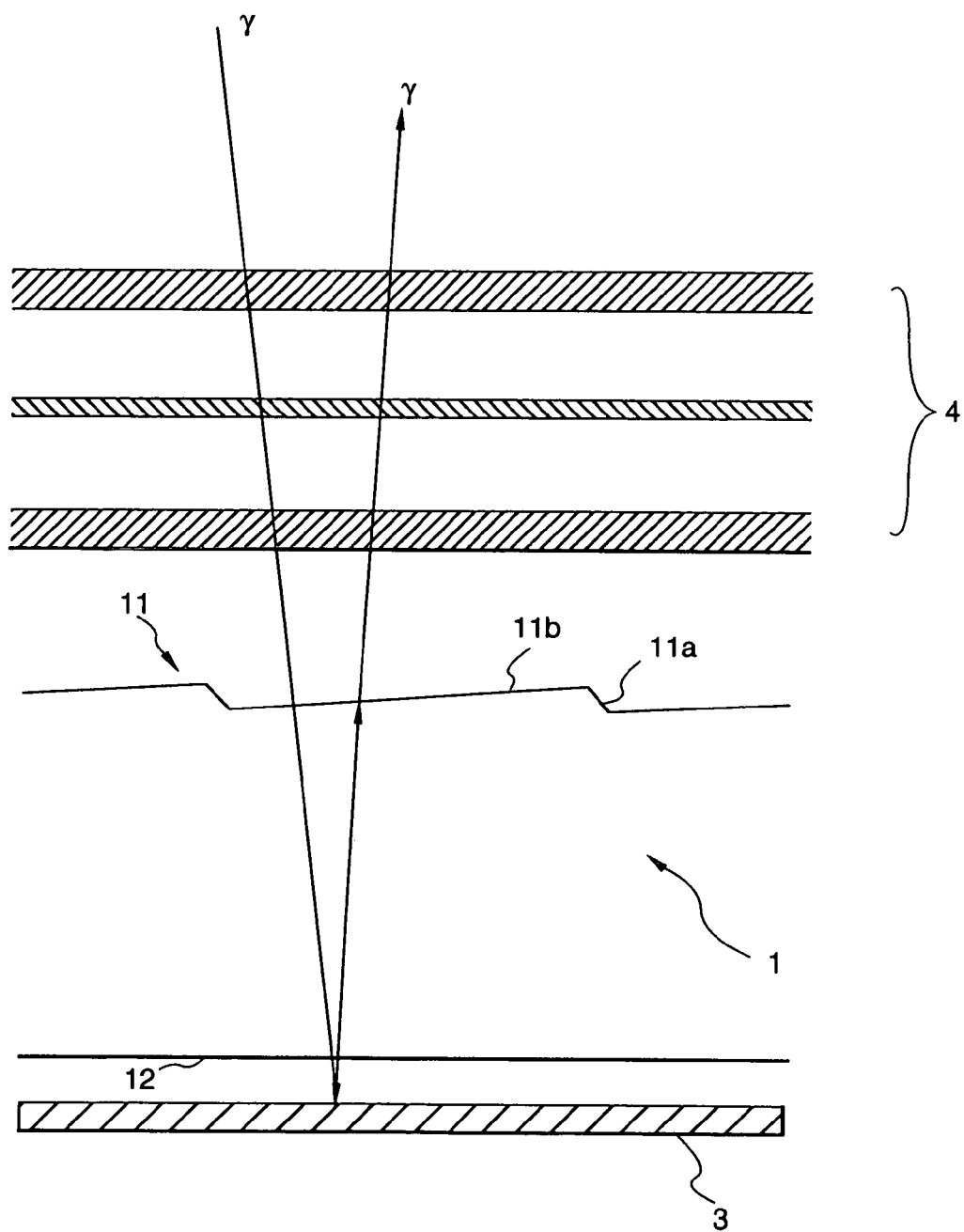
FIG. 4 shows an explanatory view of a visual recognition state in a reflection mode.

On the other hand, the long side surface aims at transmitting the light reflected by the short side surface and inverted through the reflection layer 3 as shown by the polygonal line arrow in FIG. 3, and aims at receiving external light in a reflection mode and transmitting the light reflected through the reflection layer 3 as shown by the polygonal line arrow in FIG. 4. From this point of view, the inclination angle $\theta_2$ of the long side surface with respect to the reference plane 12a of the lower surface is preferably set to be not larger than 10 degrees. If the inclination angle $\theta_2$ is larger than 10 degrees, the change of the light path due to refraction becomes large, resulting in reduction of light intensity in the frontal direction disadvantageously to display.

Incidentally, the inclination angle $\theta_2$ of the long side surface may be set to be 0 degree. However, if it is set to be larger than 0 degree, transmitted light is allowed to be collimated when the transmitted light incident on the long side surface is reflected so as to be supplied to the short side surface. Hence, the directivity of the reflected light through the short side surface can be improved advantageously to display. From the point of view of increase of light intensity in the frontal direction, collimation of transmitted light, or the like, the preferred inclination angle $\theta_2$ of the long side surface is not larger than 8 degrees, especially not larger than 5 degrees.

The preferred long side surfaces from the point of view of the function, or the like, of the long side surfaces of the light pipe are provided so that the difference between the inclination angles $\theta_2$ of the long side surfaces is set to be within 5 degrees, especially within 4 degrees, particularly within 3 degrees all over the light pipe and that the difference between inclination angles $\theta_2$ of adjacent long side surfaces is set to be within 1 degrees, especially within 0.3 degrees, particularly within 0.1 degrees.

The aforementioned difference between the inclination angles $\theta_2$ is set on the premise that the inclination angle of each long side surface is not larger than 10 degrees as described above. That is, the premise is that such a small inclination angle $\theta_2$ is set to be in the allowed range to suppress deflection of a display image caused by refraction at the time of transmission of light through the long side surface. This aims at setting of an observation point in a direction near the vertical direction so that the direction of optimum visual recognition of the liquid-crystal display device thus optimized is not changed.

A device excellent in efficiency in incidence of external light and excellent in efficiency in light transmitting or outputting of a display image through liquid-crystal cells is preferred to a device which can obtain a brilliant display image. In this respect, prism-like irregularities are preferably provided so that the projected area of each long side surface on to a reference plane of the lower surface is not smaller than 8 times, especially 10 times, particularly 15 times as large as the projected area of each short side surface on the reference plane. By this measure, a large part of the display image through the liquid-crystal cells can be transmitted through the long side surfaces.

Incidentally, when the display image through the liquid-crystal cells is transmitted, the display image incident on the short side surfaces is reflected to the incident side surface side so as not to be output from the upper surface or is deflected in a largely different direction, for example, in the direction opposite to the display image transmitted through the long side surfaces with reference to a normal line with respect to the lower surface so as to be output. Hence, the display image incident on the short side surfaces has little influence on the display image transmitted through the long side surfaces.

Accordingly, it is preferable in this respect that the short side surfaces are not localized relative to pixels of the liquid-crystal cells. Carrying logic to extremes, the display image through the long side surfaces in a direction near the vertical direction is hardly visible when the short side surfaces overlap with the pixels as a whole. Hence, from the point of view of preventing such an unnatural display from being caused by shortage of transmission of display light, or the like, it is preferable that the area of overlap of the short side surfaces with the pixels is reduced to secure sufficient transmissivity of light transmitted through the long side surfaces.

The pixel pitch for the liquid-crystal cells is generally in a range of from 100 to 300 $\mu$m. In consideration of the aforementioned point, the formability of the prism-like irregularities, and so on, the short side surfaces are preferably formed so that the projected width of each short side surface on the reference plane of the lower surface is not larger than 40 $\mu$m, especially in a range of from 1 to 20 $\mu$m, particularly in a range of from 3 to 15 $\mu$m.

Incidentally, a higher-grade technique is required for forming the short side surfaces as the projected width of each short side surface decreases. As a result, a scattering effect may appear as a cause of disorder of the display image, or the like, when the vertex of each of the prism-like irregularities is rounded with a curvature radius of not smaller than a predetermined value. Further, also from the point of view of the coherence length of a fluorescent tube generally set to be about 20 $\mu$m, or the like, there is a tendency that diffraction, or the like, is apt to occur so as to be a cause of lowering of the display quality when the projected width of each short side surface decreases.

Although it is preferable from the aforementioned point that the interval between the short side surfaces is relatively large, illumination at the time of lighting up may become more sparse to bring still an unnatural display when the interval is too large because the short side surfaces substantially serve as a portion having a function for outputting light incident on the side surface. In consideration of these points, the repetition pitch P of the prism-like irregularities as shown, by way of example, in FIG. 2 is preferably set to be in a range of from 50 $\mu$m to 1.5 mm. Incidentally, the pitch may be so irregular as to be provided, for example, as a random pitch, a random or regular combination of a predetermined number of pitch units, or the like. Generally, however, it is preferable to fix the pitch.

In the case of the light output means constituted by prism-like irregularities, moire may occur because of interference with pixels of the liquid-crystal cells. Although prevention of moire can be performed by controlling the pitch of the prism-like irregularities, the pitch of the prism-like irregularities needs to be in a preferred range as described above. Hence, a countermeasure to occurrence of moire in spite of the pitch range becomes a subject of discussion.

According to the present invention, there may be preferably used a method in which the prism-like irregularities are formed to be inclined with respect to the reference plane of the incident side surface so that the prism-like irregularities can be arranged to cross pixels to thereby prevent occurrence of moire. In this case, if the inclination angle is too large, deflection occurs in reflection through the short side surfaces. As a result, the direction of output light is biased largely, so that anisotropy of emitted light intensity in the light-transmitting direction of the light pipe becomes large. As a result, light utilizing efficiency is also lowered, and this is apt to cause lowering of display quality.

It is desirable from this point of view that the direction of arrangement of the prism-like irregularities with respect to the reference plane of the incident side surface, that is, the inclination angle in the ridgeline direction of the prism-like irregularities is within ±35 degrees, preferably within ±30 degrees, more preferably within ±25 degrees. Incidentally, the sign "±" means the direction of inclination with reference to the incident side surface. When resolution of the liquid-crystal cells is so low that moire does not occur or is negligible, a better result is obtained as the direction of arrangement of the prism-like irregularities is more parallel with the incident side surface.

Any suitable form can be applied to the light pipe as described above. Also when the light pipe is formed like a wedge, or the like, the shape of the light pipe can be determined suitably and any suitable surface shape such as a straight-line surface, a curved surface, or the like, may be applied to the light pipe. Also the slope constituting the light output means and each of the prism-like irregularities may be formed in any surface configuration such as a straight-line surface, a refractive surface, a curved surface, or the like.

Further, the prism-like irregularities may be constituted by a combination of irregularities different in shape, or the like, in addition to the pitch. Further, the prism-like irregularities may be formed as a series of projections or recesses having continuous ridge lines or may be formed as intermittent projections or recesses which are arranged discontinuously in a ridge direction at intervals of a predetermined pitch.

The respective shapes of the lower and incident side surfaces of the light pipe need not be particularly limited but may be determined suitably. Generally, these surfaces are provided as a flat lower surface and an incident side surface perpendicular to the lower surface. The incident side surface may be formed, for example, into a concavely curved shape, or the like, corresponding to the outer circumference, or the like, of the light source so that improvement of light-incidence efficiency is attained. In addition, an incident side surface structure having an introductory portion interposed between the incident side surface and the light source may be provided. The shape of the introductory portion may be determined suitably in accordance with the shape of the light source, or the like.

The light pipe may be made of any suitable material which exhibits transparency in accordance with the wavelength range of the light source. Examples of the material used in a visible light range include transparent resin, for example, represented by acrylic resin, polycarbonate resin, epoxy resin, or the like; glass; and so on. A light pipe made of a material exhibiting no double refraction or slight double refraction is preferably used.

The light pipe may be formed by a cutting method or by any suitable method. Examples of the preferred producing method from the point of view of mass production, or the like, are: a method of transferring a shape to thermoplastic resin in a condition that the thermoplastic resin is hot-pressed against a mold capable of forming a predetermined shape; a method of filling a mold capable of forming a predetermined shape with hot-melted thermoplastic resin or with resin fluidized by heat or by a solvent; a method of performing a polymerizing process after filling a mold capable of forming a predetermined shape with liquid resin polymerizable by heat, by ultraviolet rays, by radiation, etc., or after casting the liquid resin in the mold; and so on.

Incidentally, the light pipe may be formed as a laminate of parts made of one kind of material or different kinds of materials, such as for example a laminate of a light-guide portion having a role of light transmission and a sheet having light output means (upper surface) such as prism-like irregularities, or the like, formed thereon. The sheet is bonded to the light-guide portion. That is, the light pipe need not be formed as an integral single-layer body constituted by one kind of material.

The thickness of the light pipe can be determined suitably on the basis of the size of the light pipe, the size of the light source, etc. in accordance with the purpose of use. The general thickness of the light pipe in use for forming a liquid-crystal display device, or the like, is not larger than 5 mm, especially in a range of from 0.1 to 3 mm, particularly in a range of from 0.3 to 2 mm, on the basis of the incident side surface thereof.

Before the attachment of the reflection layer, the preferred light pipe from the point of view of achievement of brilliant display, or the like, is provided so that the total light-rays transmissivity of incident light in directions of the upper and lower surfaces, particularly vertical incident light from the lower surface to the upper surface, is not lower than 90%, especially not lower than 92%, particularly not lower than 95% and that the haze is not higher than 30%, especially not higher than 15%, particularly not higher than 10%.

According to the light pipe of the present invention, incident light from the upper and lower surfaces passes through the lower or upper surface effectively. Hence, use of the light pipe makes it possible to form various devices such as a liquid-crystal display device, which can be used both in a reflection and a transmission mode and which is brilliant, easy to see and excellent in low electric power consumption because light accurately collimated by the light pipe is output in a direction excellent in perpendicularity advantageous to visual recognition so that the light emitted from the light source can be utilized efficiently.

In the liquid-crystal display device used both in the reflection and transmission modes, the arrangement of the reflection layer is essential for achievement of display in the reflection mode. According to the present invention, the reflection layer is arranged on the lower surface 12 of the light pipe as shown in FIG. 1. The reflection layer 3 may be disposed so as to be separated from the lower surface of the light pipe or may be preferably in contact with the lower surface so as to be integrated with the lower surface as shown in FIG. 1.

The reflection layer can be made of a suitable material according to the background art. Especially, examples of the preferred materials are: a coating layer of binder resin impregnated with powder of a high-reflectivity metal such as aluminum, silver, gold, copper, chromium, or the like, or an alloy thereof; a layer of the aforementioned metal or a dielectric multilayer film deposited by a suitable thin-film forming method such as a vacuum evaporation method, a sputtering method, or the like; a reflection sheet of the aforementioned coating or deposited layer supported by a base material of a film, or the like; and a reflection layer made of metal foil, or the like.

The reflection layer preferred from the point of view of prevention of occurrence of moire, improvement in uniformity of display, or the like, on the basis of relaxation of bright-line intensity is provided so that diffuse reflection occurs. Because great reduction of the aforementioned light directivity is disadvantageous, the intensity of diffusion is preferably set to be in a range of from about 5 to 15 degrees in terms of the average diffusion angle but is not limited thereto. The diffusion type reflection layer can be formed by a suitable method such as a reflection surface roughening method, or the like, according to the background art.

A process for bringing the aforementioned reflection layer into contact with the lower surface of the light pipe to integrate the reflection layer with the light pipe can be performed by a suitable method such as a method using adhesive means such as a tacky layer, another adhesive layer, or the like, as a mediator, a method of forming the aforementioned coating or deposited layer directly on the lower surface of the light pipe, or the like. In this case, it is preferable from the point of view of preventing injury, oxidative degradation, etc. of the reflection surface that the outer surface of the reflection layer is protected by coating. In this respect, the aforementioned reflection sheet, or the like, may be used preferably. According to the reflection sheet, the aforementioned diffusion type reflection layer can be formed easily through the roughened surface of the film base material, or the like.

Incidentally, the treatment for roughening the surface of the aforementioned reflection layer or the support base material thereof can be performed by a suitable method such as a mechanical or chemical processing method of the type using embossing, buffing or transferring a rough-surface shape of a metal mold, a method of impregnating the reflection layer with suitable particles such as inorganic particles of silica, alumina, titania, zirconia, tin oxide, indium oxide, cadmium oxide, antimony oxide, etc. which may be electrically conductive, organic particles of crosslinked or non-crosslinked polymers, etc., or the like, a method of applying the impregnated layer, or the like.

When the liquid-crystal display device is to be formed, the light source 2 is disposed near to the incident side surface 13 of the light pipe 1 as shown in FIG. 1, so that the light source 2 serves as the back light of a side light type. Any suitable material can be used as the light source. Examples of the material which can be used preferably are: a linear light source such as a (cold or hot) cathode tube, or the like; a point light source such as a light-emitting diode, or the like; an array of point light sources arranged in a line, a plane, or the like; a light source using a system for converting a point light source into a regular-interval or irregular-interval linear light-emitting state; and so on.

According to the present invention, the light source is provided to make visual recognition possible in a transmission mode. Accordingly, the light source is provided so as to be able to be switched on/off because it is not necessary to switch the light source on for visual recognition in a reflection mode. Any method can be employed as a method for switching the light source on/off. Any one of background-art methods may be employed. Incidentally, the light source may be attached to the light pipe in advance so that the light pipe can be disposed in the form of a light pipe having a light source.

For the formation of the liquid-crystal display device, the light source may be provided as a combination body in which suitable auxiliary means such as a light source holder for surrounding the light source to lead scattered light from the light source 2 to the incident side surface 13 of the light pipe 1 is disposed as occasion demands. A resin sheet with a high-reflectivity metal thin film attached thereto, metal foil, or the like, is generally used as the light source holder. When the light source holder is bonded to an end portion of the light pipe through an adhesive, or the like, the formation of the light output means in the adhesive portion may be omitted.

Incidentally, the liquid-crystal display device is generally formed, as shown in FIG. 1, by suitably assembling the liquid-crystal cells 42, a driver attached to the liquid-crystal cells 42, the polarizing plates 41 and 43, the back light 1 and 2, the reflection layer 3 and constituent parts such as a compensating phase difference plate, etc. as occasion demands. The liquid-crystal cells 42 are provided with a transparent electrode (not shown) so as to function as a liquid-crystal shutter.

The liquid-crystal cells to be used are not particularly limited. For example, in classification based on the form of orientation of the liquid crystal, TN liquid-crystal cells or STN liquid-crystal cells, perpendicularly oriented cells or HAN cells, twisted cells such as OCB cells or non-twisted cells, guest-host type cells or ferroelectric liquid-crystal type liquid-crystal cells, etc. may be used suitably. Further, the liquid crystal driving system is not particularly limited. For example, a suitable driving system such as an active matrix system, a passive matrix system, or the like, may be used.

Although any suitable polarizing plate can be used as each of the polarizing plates, a polarizing plate such as an iodine type or dye type absorption linear polarizer high in the degree of polarization may be preferably used from the point of view of obtaining a good contrast ratio display based on incidence of high-grade linearly polarized light. Incidentally, a polarizing plate may be provided on each of the opposite sides of the liquid-crystal cells 42 as shown in the embodiment of FIG. 1 or a polarizing plate may be provided on a single side of the liquid-crystal cells.

For the formation of the liquid-crystal display device, for example, a diffusion plate, an anti-glare layer and a protective layer to be provided on the visual recognition side or a suitable optical element such as a compensating phase difference plate to be provided between the liquid-crystal cell and the polarizing plate may be arranged suitably. The compensating phase difference plate aims at compensating double refraction's dependence on wavelength to attain improvement in visual recognition, or the like.

The compensating phase difference plate is disposed on the visual recognition side or/and between the back-side polarizing plate and the liquid-crystal cell, or the like, as occasion demands. According to the present invention, it is preferable from the point of view of keeping the light output characteristic of the light pipe as sufficiently as possible that the optical layer disposed between the liquid-crystal cell and the light pipe is as small as possible. Incidentally, a suitable plate can be used as the compensating phase difference plate in accordance with the wave range, or the like. The compensating phase difference plate may be formed as a single layer or as a layer of superposition of two or more phase difference layers.

Visual recognition on the liquid-crystal display device according to the present invention is performed through light transmitted through the long side surfaces of the light pipe as described above. Incidentally, in a transmission mode, light a emitted from the lower surface of the light pipe 1 in the switched-on state of the light source as shown by the arrow in FIG. 3 is reflected through the reflection layer 3 and transmitted through the long side surfaces 11b of the light pipe 1, so that a display image ($\alpha$) is visually recognized via the polarizing plates 43 and 41 and the liquid-crystal cells 42.

On the other hand, in a reflection mode, external light $\gamma$ as shown by the arrow in FIG. 4 in the switched-off state of the light source is transmitted through the long side surfaces 11b of the upper surface of the light pipe 1 via the polarizing plates 41 and 43 and the liquid-crystal cells 42. Then, the transmitted light is reflected through the reflection layer 3 and transmitted through the long side surfaces 11b of the light pipe 1 in the same manner as described above in the transmission mode, so that a display image ($\gamma$) is visually recognized via the polarizing plates 43 and 41 and the liquid-crystal cells 42.

According to the present invention, optical elements or parts such as the light pipe, the liquid-crystal cells, the polarizing plates, etc. constituting the aforementioned liquid-crystal display device may be wholly or partially laminated and fixed so as to be integrated with one another or may be disposed in an easily separable state. From the point of view of prevention of lowering of contrast due to suppression of interfacial reflection, or the like, it is preferable that the optical elements or parts are fixed. A suitable transparent adhesive such as an adhesive can be used for the fixing and contacting process. In addition, the transparent adhesive layer may be impregnated with the aforementioned fine particles, or the like, so that the transparent adhesive layer can be provided as an adhesive layer exhibiting a diffusing function.

EXAMPLE 1

A surface of a polymethyl methacrylate plate processed into a predetermined shape in advance was cut by a diamond bit so that a light pipe having light output means at its upper surface was obtained. The light pipe was 40 mm wide and 25 mm deep. The light pipe was 1 mm thick at its incident side surface and 0.6 mm thick at its opposite end. Upper and lower surfaces of the light pipe were flat. The light pipe had prism-like irregularities at its upper surface. The prism-like irregularities were arranged at intervals of a pitch of 210 μm so as to be parallel with the incident side surface. Each of the prism-like irregularities had a short side surface inclined at an inclination angle changing in a range of from 42.5 to 43 degrees, and a long side surface inclined at an inclination angle changing in a range of from 1.8 to 3.5 degrees. The change of the inclination angle between adjacent long side surfaces was within 0.1 degrees. The protected width of the short side surface on the lower surface was from 10 to 16 μm. The projected area ratio of long side surface/short side surface on the lower surface was not lower than 12. Incidentally, the light output means was formed so as to extend from a position at a distance of 2 mm from the incident side surface.

A cold-cathode tube (made by HARISON ELECTRIC Co., Ltd.) with a diameter of 2.4 mm was disposed near to the incident side surface of the light pipe. An edge of the cold-cathode tube was surrounded by a light source holder made of a white lamp reflection sheet so as to come into contact with the upper and lower end surfaces of the light pipe. An inverter and a DC power supply were connected to the cold-cathode tube. A silver reflection plate bonded to an acrylic plate was set on the lower surface of the light pipe. Monochrome TN type liquid-crystal cells were disposed on the upper surface of the light pipe. Thus, a liquid-crystal display device was obtained. Incidentally, the aforementioned light source was able to be switched on/off by turning the DC power supply on/off. Further, the aforementioned silver reflection plate was of a diffusion type in which a vapor deposit layer of silver was formed on a matted film base material and in which a surface of the vapor deposit layer was coated with a transparent resin layer so as to be protected.

EXAMPLE 2

A liquid-crystal display device was obtained according to Example 1 except that the silver reflection plate was bonded by a tacky layer to the lower surface of the light pipe through the reflection surface of the silver reflection plate.

EXAMPLE 3

A liquid-crystal display device was obtained according to Example 1 except that a reflection sheet having a mirror silver reflection surface was used as a substitute for the silver reflection plate and was bonded to the lower surface of the light pipe through the reflection surface by a tacky layer containing silicone resin.

EXAMPLE 4

A light pipe was obtained according to Example 1 except that the pitch of the prism-like irregularities was set to be 2 mm, the inclination angle of the short side surface was set to be in a range of from 42.6 to 42.8 degrees, the inclination angle of the long side surface was set to be in a range of from 1.9 to 3.6 degrees, the projected width of the short side surface on the lower surface was set to be in a range of from 100 to 150 μm and the projected area ratio of long side surface/short side surface on the lower surface was set to be not lower than 11. A liquid-crystal display device was obtained by use of the light pipe.

EXAMPLE 5

A light pipe was obtained according to Example 1 except that the pitch of the prism-like irregularities was set to be 210 μm, the inclination angle of the short side surface was set to be in a range of from 31 to 35 degrees, the inclination angle of the long side surface was set to be in a range of from 1.8 to 3.5 degrees, the projected width of the short side surface on the lower surface was set to be in a range of from 15 to 21 μm and the projected area ratio of long side surface/short side surface on the lower surface was set to be not lower than 9. A liquid-crystal display device was obtained by use of the light pipe.

EXAMPLE 6

A light pipe was obtained according to Example 1 except that the pitch of the prism-like irregularities was set to be 210 μm, the inclination angle of the short side surface was set to be in a range of from 42.6 to 42.8 degrees, the inclination angle of the long side surface was set to be in a range of from 6.3 to 9.5 degrees, the projected width of the short side surface on the lower surface was set to be in a range of from 25 to 35 μm and the projected area ratio of long side surface/short side surface on the lower surface was set to be in a range of from 5 to 7. A liquid-crystal display device was obtained by use of the light pipe.

EXAMPLE 7

A light pipe was obtained according to Example 1 except that the ridgeline direction of the light output means was inclined at 10 degrees with respect to the incident side surface. A liquid-crystal display device was obtained by use of the light pipe.

EXAMPLE 8

A light pipe was obtained according to Example 1 except that the ridgeline direction of the light output means was inclined at 40 degrees with respect to the incident side surface. A liquid-crystal display device was obtained by use of the light pipe.

EXAMPLE 9

A light pipe having light output means formed by sand-blasting the upper surface of a polymethyl methacrylate plate which was 40 mm wide, 25 mm deep, 1 mm thick at its incident side surface and 0.6 mm thick at its opposite end was prepared. A liquid-crystal display device was obtained according to Example 1 except that the thus prepared light pipe was used.

EXAMPLE 10

A light pipe having light output means constituted by scattering dots formed by printing with titanium white-dispersed white ink in the form of dots on an upper surface of a polymethyl methacrylate plate which was 40 mm wide, 25 mm deep, 1 mm thick at its incident side surface and 0.6 mm thick at its opposite end was prepared. A liquid-crystal display device was obtained according to Example 1 except that the thus prepared light pipe was used.

EXAMPLE 11

A liquid-crystal display device was obtained according to Example 1 except that the light pipe was turned upside down.

EXAMPLE 12

A liquid-crystal display device was obtained according to Example 10 except that the light pipe was turned upside down and that a light diffusion plate was disposed on an upper surface of the light pipe.

Evaluation Test

With respect to the liquid-crystal display device obtained in each of Examples and Comparative Examples, frontal brightness in a white display state in each of transmission and reflection modes was examined by a brightness meter (BM7, made by TOPCON Corp.). Incidentally, frontal brightness in a transmission mode was evaluated in the condition that the light source was switched on in a dark room. On the other hand, frontal brightness in a reflection mode was evaluated in the condition that the light source was switched off in the dark room but the device was illuminated by a ring-like illuminator disposed in a position at a distance of 10 cm upward from the center portion of the device.

Results of the above description were as shown in the following Table.

|  | Frontal Brightness (cd/m$^2$) | |
| --- | --- | --- |
|  | Transmission Mode | Reflection Mode |
| Example 1 | 345 | 867 |
| Example 2 | 321 | 826 |
| Example 3 | 335 | 883 |
| Example 4 | 344 | 891 |
| Example 5 | 106 | 799 |
| Example 6 | 217 | 690 |
| Example 7 | 286 | 811 |
| Example 8 | 67 | 819 |
| Example 9 | 75 | 624 |
| Example 10 | 132 | 462 |
| Example 11 | 485 | 822 |
| Example 12 | 166 | 491 |

Further, a line-like pattern was displayed in each of transmission and reflection modes in the aforementioned condition and the display quantity thereof was examined. From results thereof and the aforementioned Table, Examples 1, 2, 3 and 7 were particularly good because uniform brilliance was obtained in the device as a whole without any visual sense dazzling light. Incidentally, in Example 9, the angle of output light in a transmission mode was so large that the display was dark in a frontal direction. Example 10 had the same tendency. Further, in Example 10, dots given to the light pipe were observed so conspicuously that the display quality was lowered greatly.

On the other hand, Example 4 was good in brilliance but defective in uniformity of brilliance because the difference between light and darkness due to the bright lines was large. Moreover, the wide slope portions of the light pipe were observed so conspicuously that the display quality was lowered to make the line pattern hard to see. In Example 5, lowering of frontal brightness was found because of inclination of the output angle. Example 6 lacked uniformity of brilliance as a whole because the neighborhood of the light source was too brilliant. In Example 8, lateral output light was so intensive that the display was dark in a frontal direction. Also in Example 11, the difference between light and darkness due to the bright lines was so large that the display was hard to see because of the visual sense of dazzling light. Example 12 was inferior in brightness in spite of uniform brilliance.

Also in a reflection mode, Examples 1, 2, 3 and 7 were particularly good because high brightness was exhibited so that very clear and brilliant display was obtained. In Example 10, brightness was lowered because of diffusion of light, so that dots were observed so clearly as to hurt the display quality. Also in Example 4, the wide slope portions of the light pipe were observed so conspicuously that the display quality was lowered to make the line pattern hard to see. Example 12 was inferior in brightness in spite of uniform brilliance.

On the other hand, when the reflection plate in Example 1 was disposed without reinforcement with an acrylic plate while the reflection plate was wrinkled or partially bent, wrinkles, or the like, were found so clearly both in a reflection and a transmission mode that visual recognition was lowered. When the reflection plate was bonded to the light pipe as in Examples 2, 3 and 7, wrinkling, partial bending, or the like, did not occur so that good display was always obtained.

It is apparent from the above description that the light source can be switched on/off by turning the power supply on/off to thereby achieve a liquid-crystal display device exhibiting good display characteristic both in transmission and reflection modes and that use of the reflection mode together with the transmission mode permits electric power consumption to be saved so that the working life of a battery to be used in a portable display device, or the like, can be made longer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising:
    a light pipe including light output means for outputting light, said light output means formed on an upper surface of said light pipe;
    a light source disposed near an incident side surface of said light pipe, light traveling along said light pipe being reflected toward a lower surface of said light pipe;
    a reflection layer disposed on said lower surface of said light pipe so that said reflected light is again reflected, toward the upper surface of said light pipe, to be transmitted through said upper surface of said light pipe; and a liquid-crystal shutter disposed above said upper surface of said light pipe, said liquid-crystal shutter including liquid-crystal cells and at least one polarizing plate, further wherein
    said light output means comprises a repetitious structure of continuous or discontinuous prism-like irregularities, each of said prism-like irregularities comprising:

a short side surface constituted by a slope inclined downward from the incident side surface toward an opposite end of the incident side surface at an inclination angle of less than 45 degrees with respect to a reference plane of said lower surface, and wherein each of said prism-like irregularities are arranged at intervals of a pitch of from 50 $\mu$m to 1.5 mm and further comprise:

a long side surface constituted by a slope inclined at an inclination angle in a range of from 0 to 10 degrees, exclusive of 0 degree, with respect to said reference plane so that the difference in the inclination angle among all of said slopes of the long side surface is within 5 degrees and the difference in the inclination angle between adjacent long side surfaces is within 1 degree, wherein a vertex of each of the prism-like irregularities is rounded with a predetermined curvature radius.

2. A liquid-crystal display device according to claim 1, wherein said light source is disposed adjacent to the incident side surface of said light pipe, and said light source is operable to be switched on and off.

3. A liquid-crystal display device according to claim 1, wherein said light output means further comprises:

flat surfaces inclined at a crossing angle of not larger than 10 degrees with respect to said reference plane wherein a projected area of said flat surfaces on said reference plane is not smaller than 8 times as large as a projected area of said slopes on said reference plane.

4. A liquid-crystal display device according to claim 1, wherein a repetitious pitch of said prism-like irregularities is fixed.

5. A liquid-crystal display device according to claim 1, wherein a projected width of each of said short side surfaces on said reference plane is not larger than 40 $\mu$m.

6. A liquid-crystal display device according to claim 1, wherein a ridgeline direction of said prism-like irregularities is within ±35 degrees with respect to a reference plane of said incident side surface.

7. A liquid-crystal display device according to claim 1, wherein incident light from said lower surface is transmitted through said upper surface at total light-rays transmissivity of not lower than 90%.

8. A liquid-crystal display device according to claim 1, wherein said reflection layer on the lower surface of said light pipe is made at least one of selected from the group consisting of gold, silver, aluminum, and a dielectric multilayer film.

9. A liquid-crystal display device according to claim 1, wherein said reflection layer on the lower surface of said light pipe is in contact with said lower surface of said light pipe so as to be integrated with said light pipe.

10. A liquid-crystal display device according to claim 1, wherein said reflection layer on the lower surface of said light pipe reflects light while diffusing said light.

11. A light pipe comprising:
an incident side surface;
an upper surface;
a lower surface with which a reflection layer is directly integrated; and
light output means formed on said upper surface so that incident light from said incident side surface is reflected toward said lower surface, and rereflected by the reflection layer to be transmitted through said upper surface, wherein said light output means comprises:

slopes facing said incident side surface and inclined at an angle of less than 45 degrees with respect to a reference plane of said lower surface, wherein said light output means has a repetitious structure of continuous or discontinuous prism-like irregularities arranged at intervals of a pitch of from 50 $\mu$m to 1.5 mm, each of said prism-like irregularities comprising:

said slopes facing said incident side surface; and a long side surface constituted by a slope inclined at an inclination angle in a range of from 0 to 10 degrees, exclusive of 0 degree, with respect to said reference plane so that the difference in the inclination angle among all of said slopes of the long side surface is within 5 degrees and the difference in the inclination angle between adjacent long side surfaces is within 1 degree, wherein a vertex of each of the prism-like irregularities is rounded with a predetermined curvature radius.

12. A light pipe according to claim 11, wherein a repetitious pitch of said prism-like irregularities is fixed.

13. A light pipe according to claim 11, wherein a projected width of each of slopes facing said incident side surface on said reference plane is not larger than 40 $\mu$m.

14. A light pipe according to claim 11, wherein a ridgeline direction of said prism-like irregularities is within ±35 degrees with respect to a reference plane of said incident side surface.

15. A light pipe according to claim 11, wherein said light pipe transmits light through said upper surface at total light-rays transmissivity of not lower than 90% when said light is incident from said lower surface in a condition that said light pipe does not have the reflection layer.

16. A light pipe according to claim 11, wherein said reflection layer on the lower surface of said light pipe is made at least one of selected from the group consisting of gold, silver, aluminum, and a dielectric multilayer film.

17. A light pipe according to claim 11, wherein said reflection layer on the lower surface of said light pipe is in contact with said lower surface of said light pipe so as to be integrated with said light pipe.

18. A light pipe according to claim 11, wherein said reflection layer on the lower surface of said light pipe reflects light while diffusing said light.

19. The liquid-crystal display device of claim 1, wherein said short side surface is inclined at an angle of not less than 35 degrees.

20. The liquid-crystal display device of claim 11, wherein said slopes facing said incident side surface are inclined at an angle of not less than 35 degrees.

21. The liquid-crystal display device of claim 1, wherein a projected area of the long side surfaces on said reference plane is not smaller than 8 times as large as a projected area of the short side surfaces on said reference plane.

22. The liquid-crystal display device of claim 11, wherein a projected area of the long side surfaces on said reference plane is not smaller than 8 times as large as a projected area of said slopes facing said incident side surface on said reference plane.

* * * * *